United States Patent
Cecola et al.

(10) Patent No.: US 10,814,942 B1
(45) Date of Patent: Oct. 27, 2020

(54) METHODS AND SYSTEMS FOR MANUFACTURING SURFBOARDS WITH ENHANCED STRENGTH AND REDUCTION OF HEAT RETENTION

(71) Applicant: Universal Brands, LLC, Lake Forest, IL (US)

(72) Inventors: Alexander Cecola, Manhattan Beach, CA (US); Sophia Cecola, Lake Forest, IL (US)

(73) Assignee: Universal Brands, LLC, Lake Forest, IL (US)

( * ) Notice: Subject to any disclaimer, the term of this patent is extended or adjusted under 35 U.S.C. 154(b) by 0 days.

(21) Appl. No.: 16/783,153

(22) Filed: Feb. 5, 2020

(51) Int. Cl.
| | | |
|---|---|---|
| *B63B 32/57* | (2020.01) | |
| *B32B 5/18* | (2006.01) | |
| *B32B 5/02* | (2006.01) | |
| *B32B 27/06* | (2006.01) | |
| *B32B 27/12* | (2006.01) | |
| *B32B 15/04* | (2006.01) | |
| *B32B 21/04* | (2006.01) | |

(52) U.S. Cl.
CPC ............... *B63B 32/57* (2020.02); *B32B 5/02* (2013.01); *B32B 5/18* (2013.01); *B32B 15/046* (2013.01); *B32B 21/047* (2013.01); *B32B 27/065* (2013.01); *B32B 27/12* (2013.01); B32B 2262/101 (2013.01); B32B 2307/416 (2013.01); B63B 2231/02 (2013.01); B63B 2231/34 (2013.01); B63B 2231/50 (2013.01); B63B 2231/70 (2013.01)

(58) Field of Classification Search
CPC . B63B 32/57; B63B 2231/02; B63B 2231/34; B63B 2231/50; B63B 2231/70; B32B 27/065; B32B 5/18; B32B 15/046; B32B 5/02; B32B 21/047; B32B 27/12; B32B 2262/101; B32B 2307/416
USPC ........................................................ 441/74
See application file for complete search history.

(56) References Cited

U.S. PATENT DOCUMENTS

| | | | | |
|---|---|---|---|---|
| 6,224,706 B1* | 5/2001 | Matich | .................... | B29C 51/16 156/212 |
| 7,275,490 B1* | 10/2007 | Sanders | .................... | B63B 5/24 114/61.2 |
| 8,727,824 B2* | 5/2014 | Reeves | .................... | B63B 32/70 441/74 |

OTHER PUBLICATIONS https://360guide.info/surfing/surfboard-construction.html "Board Construction—How Surfboards Are Made" Jan. 2, 2014, 360 Guide (Year: 2014).*

* cited by examiner

*Primary Examiner* — Anthony D Wiest
(74) *Attorney, Agent, or Firm* — Eric Kelly

(57) ABSTRACT

Surfboards may have at least one structural layer disposed between a foam core and fiberglass layers. The at least one structural layer may strengthen the surfboard as compared against surfboard without such a structural layer. The at least one structural layer may minimize and/or prevent overheating of the surfboard from sunlight exposure and/or from excessive heat. Surfboards may have at least one heat-release-valve installed within the given surfboard. The at least one heat-release-valve may minimize and/or prevent overheating of the surfboard from sunlight exposure and/or from excessive heat. Surfboards may have at least one structural layer disposed between a foam core and fiberglass layers and surfboards may have at least one heat-release-valve installed within the given surfboard.

10 Claims, 7 Drawing Sheets

METHODS AND SYSTEMS FOR MANUFACTURING SURFBOARDS WITH ENHANCED STRENGTH AND REDUCTION OF HEAT RETENTION

TECHNICAL FIELD OF THE INVENTION

The present invention relates in general to surfboards and more specifically to surfboards with at least one structural layer disposed between a foam core and fiberglass layers; and/or with at least one heat-release-valve installed in the surfboards.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Current (circa 2020) surfboards may suffer from some problems. Because of the typical foam core embedded within a plurality of fiberglass and epoxy resin layers construction, such a surfboard may undesirably snap and/or break when enough bend force is applied to the given preexisting surfboard. Such breaks and/or snaps may occur from surfing in heavying surf, dropping surfboards, catching a portion of the surfboard in a door (e.g., vehicle doors), and/or the like.

Further, also because of the typical foam core embedded within the plurality of fiberglass and epoxy resin layers construction, such a surfboard may be prone to overheating from sunlight exposure, being left inside a vehicle parked in the sun, and/or from other sources of excessive heat. Foam cores, especially closed cell foams and the like, of preexisting surfboards may be prone to overheating in direct sunlight (or from other sources of heat, such as a vehicle parked in direct sunlight with a preexisting surfboard inside). Preexisting layers, such as fiberglass-layer(s), resin-finish-layer(s), top-deck-layer(s), and/or a bottom layer(s) may contribute to retention of undesirable heat within the given preexisting surfboard. Overheating of a given preexisting surfboard may result in the foam core softening, melting, and/or liquifying resulting in a weakening of the given preexisting surfboard. Overheating of a given preexisting surfboard may result in delamination of one or more of the fiberglass-layer(s), the resin-finish-layer(s), the top-deck-layer(s), and/or the bottom layer(s) from each other and/or from the foam core, resulting in a weakening of the given preexisting surfboard. Overheating of a given preexisting surfboard may result in release and/or failure at seams, such as along edges (e.g., rails of the preexisting surfboard). Overheating of a given preexisting surfboard may result in generation of one or more undesirable soft spots in the given preexisting surfboard. All in all, overheating of a given preexisting surfboard may result in loss of strength, water intrusion, board breakage, loss of performance, a surfboard unfit for its intended purpose, board failures, weak spots, soft spots, delaminations, seam failures, combinations thereof, and/or the like.

There is a need in the art for stronger surfboard and/or surfboards with means to minimize and/or prevent undesirable overheating.

It is to these ends that the present invention has been developed.

BRIEF SUMMARY OF THE INVENTION

To minimize the limitations in the prior art, and to minimize other limitations that will be apparent upon reading and understanding the present specification, various embodiments of the present invention may describe various surfboard; as well as, methods and/or systems for making such surfboard. In some embodiments, the surfboards may have at least one structural layer disposed between a foam core and fiberglass layers of the given surfboard. In some embodiments, the at least one structural layer may strengthen the given surfboard. In some embodiments, the at least one structural layer may minimize and/or prevent overheating of the given surfboard from sunlight exposure and/or from excessive heat. In some embodiments, surfboards may have at least one heat-release-valve installed within and/or on the given surfboard. In some embodiments, the at least one heat-release-valve may minimize and/or prevent overheating of the given surfboard from sunlight exposure and/or from excessive heat. In some embodiments, surfboards may have at least one structural layer disposed between the foam core and the fiberglass layers of the given surfboards and the surfboards may have the at least one heat-release-valve installed within and/or on the given surfboard.

It is an objective of the present invention to provide a surfboard that is stronger than preexisting surfboards.

It is another objective of the present invention to provide a surfboard that is stronger than preexisting surfboards and wherein the surfboard is lighter or of comparable weight to the weaker preexisting surfboards.

It is another objective of the present invention to provide a surfboard with at least one structural-layer disposed between the foam core and the fiberglass layers.

It is another objective of the present invention to provide a surfboard with at least one structural-layer disposed between the foam core and the fiberglass layers, wherein the at least one structural-layer increases a strength of the given surfboard.

It is another objective of the present invention to provide a surfboard that has at least one means for minimizing and/or preventing overheating of the given surfboard.

It is another objective of the present invention to provide a surfboard with at least one structural-layer disposed between the foam core and the fiberglass layers, wherein the at least one structural-layer may be configured for minimizing and/or preventing overheating of the given surfboard.

It is another objective of the present invention to provide a surfboard that has at least one means for minimizing and/or preventing delamination of layers of the given surfboard.

It is another objective of the present invention to provide a surfboard that has at least one means for minimizing and/or preventing soft spots of the given surfboard.

It is another objective of the present invention to provide a surfboard with at least one structural-layer disposed between the foam core and the fiberglass layers, wherein the at least one structural-layer may be configured for minimizing and/or preventing delamination of layers of the given surfboard.

It is another objective of the present invention to provide a surfboard with at least one structural-layer disposed between the foam core and the fiberglass layers, wherein the at least one structural-layer may be configured for minimizing and/or preventing soft spots of the given surfboard.

It is another objective of the present invention to provide a surfboard with at least one heat-release-valve that is configured for minimizing and/or preventing overheating of the given surfboard.

It is another objective of the present invention to provide a surfboard with at least one heat-release-valve that is configured for minimizing and/or preventing delamination of layers of the given surfboard.

It is another objective of the present invention to provide a surfboard with at least one heat-release-valve that is configured for minimizing and/or preventing soft spots of the given surfboard.

It is yet another objective of the present invention to provide a surfboard that is efficient and cost effective to manufacture.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 1A may also show sectional line 1B-1B going across a transverse width of preexisting surfboard 100.

FIG. 2A may also show sectional line 2B-2B going across a transverse width of surfboard 200.

FIG. 3A may also show sectional line 3B-3B going across a transverse width of surfboard 300.

Figure 1A:
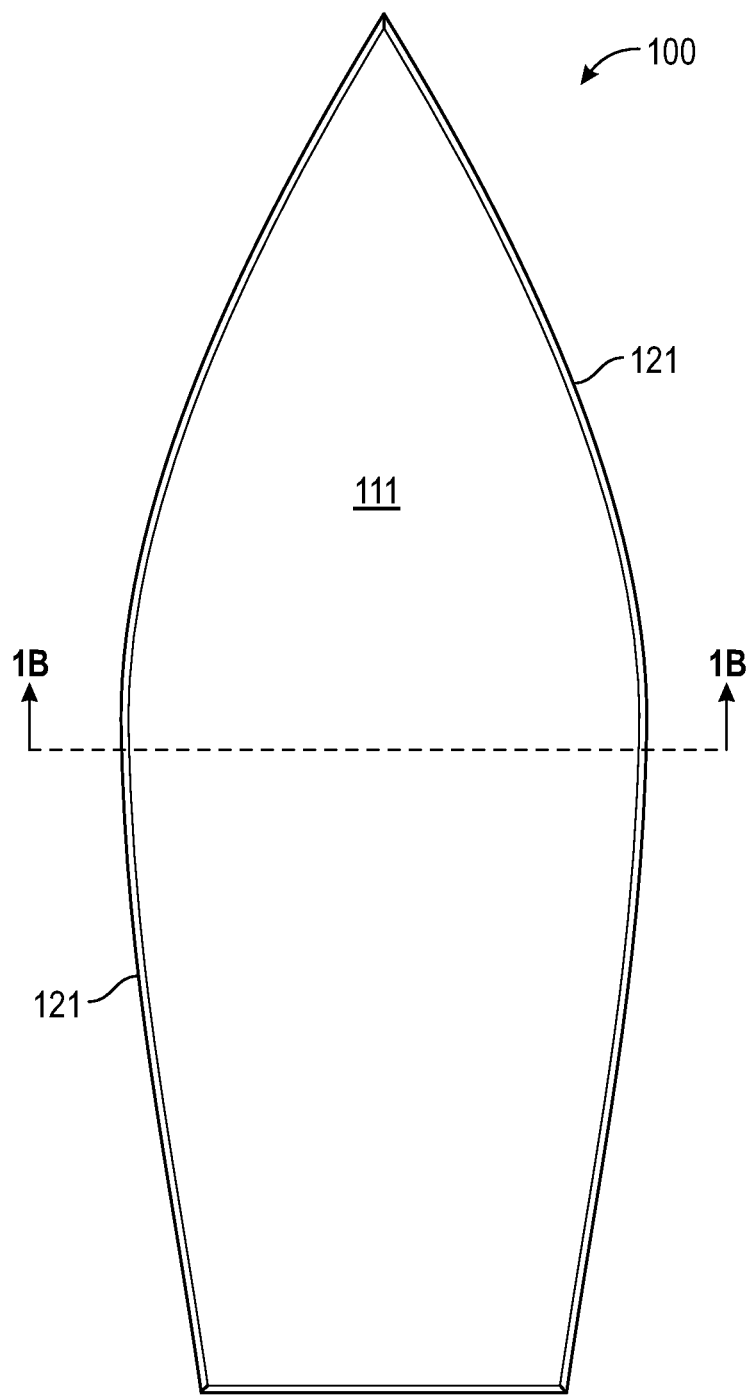
FIG. 1A may depict a top view of a preexisting surfboard 100.

REFERENCE NUMERAL SCHEDULE 100 surfboard 100
101 foam core 101
103 central-stringer 103
105 side-stringer 105
107 fiberglass-layer 107
109 resin-finish-layer 109
111 top-deck-layer 111
113 fiberglass-layer 113
115 resin-finish-layer 115
117 bottom 117
121 rail 121
200 surfboard 200
201 top-structural-layer 201
203 bottom-structural-layer 203
300 surfboard 300
301 heat-release-valve 301
303 plurality of top layers 303
305 plurality of bottom layers 305
401 housing 401
403 cavity 403
405 outer-gate 405
407 inner-gate 407
409 shaft 409
411 spring 411
413 spring-stop 413
415 outer-seat 415
417 inner-seat 417
419 inner-opening 419
421 pathway 421
423 external-opening 423
501 fin box 501
503 flange 503
505 slot-for-fin-base 505

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Figure 1B:
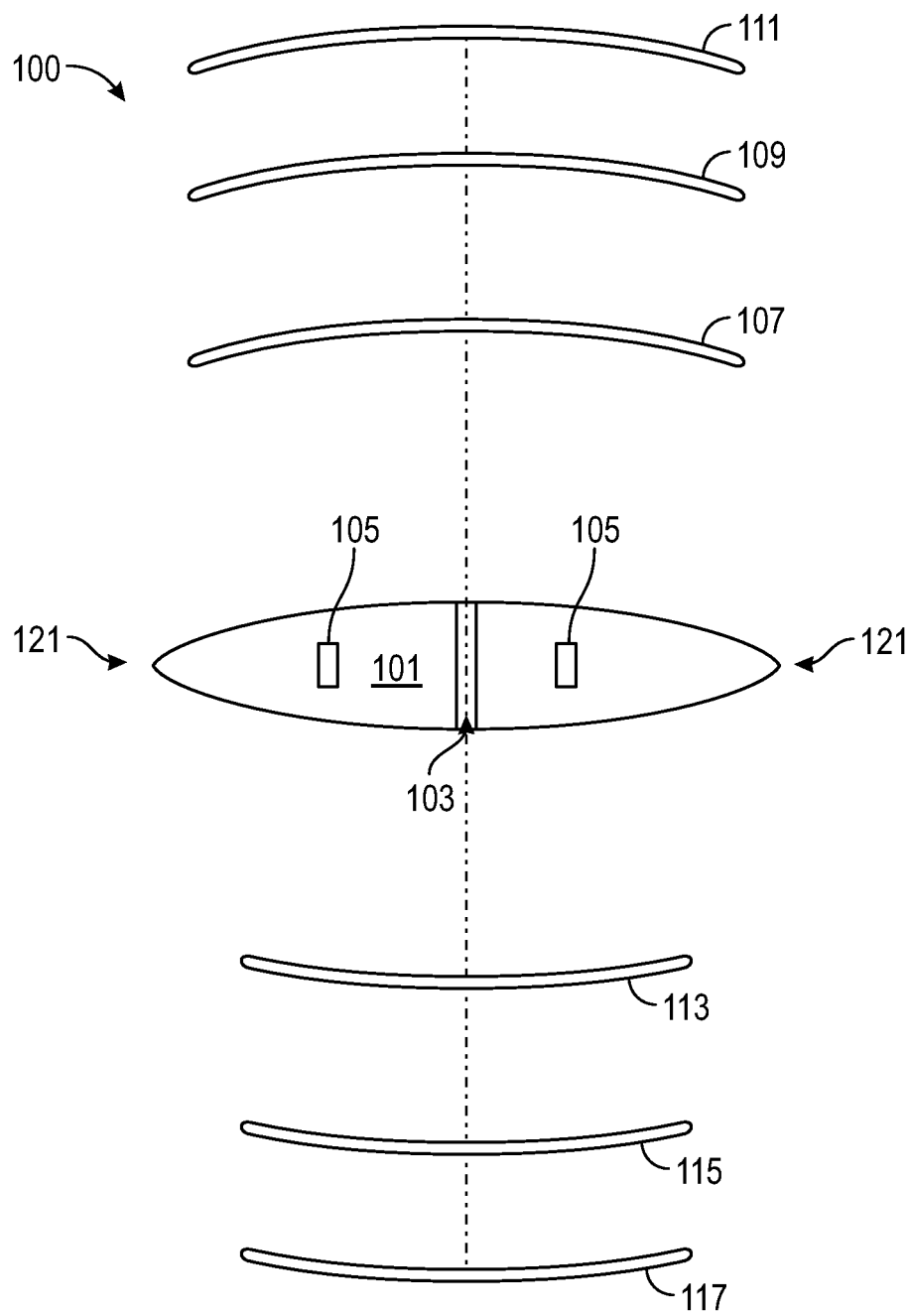
FIG. 1B may be an exploded cross-sectional view along sectional line 1B-1B of FIG. 1A.

FIG. 1A may depict a top view of a preexisting surfboard 100. FIG. 1A may show an upper portion of top-deck-layer 111 of preexisting surfboard 100. Rails 121 may run along longitudinal sides of preexisting surfboard 100. FIG. 1A may also show sectional line 1B-1B going across a transverse width of preexisting surfboard 100. FIG. 1B may be an exploded cross-sectional view along sectional line 1B-1B of FIG. 1A.

Continuing discussing FIG. 1B, preexisting surfboard 100 may have a foam core 101 at its center. Foam core 101 may have one or more stringers in its foam. Foam core 101 may be expanded polystyrene (EPS) foam, polyurethane foam, or extruded polystyrene (XPS) foam. EPS foam and polyurethane foam may be of an open cell foam. XPS foam may be closed cell. Foam core 101 may come from a foam manufacture as a blank, wherein the blank approximate a general shape of a surfboard. The blank may then be cut, milled, sanded, and/or shaped into a more desirable surfboard shape. For example, the blank may be CNC machined or the like. Foam core 101 may also be formed, cast, molded, or the like from a coffin mold (e.g., from compressed foam beads); and the output from the coffin may also be cut, milled, sanded, and/or shaped into a more desirable surfboard shape.

Continuing discussing FIG. 1B, foam core 101 may have one central-stringer 103. Foam core 101 may have two side-stringers 105. Foam core 101 may have one central-stringer 103 and two side-stringers 105, with the one central-stringer 103 disposed between the two side-stringers 105. Stringers may be wood or fiberglass.

Continuing discussing FIG. 1B, foam core 101, on its top surface, may be covered by one to three fiberglass layers/sheets (with epoxy resin), designated fiberglass-layer 107. That is, fiberglass-layer 107 may be one to three fiberglass layers/sheets (and with epoxy resin).

Continuing discussing FIG. 1B, fiberglass-layer 107 may be covered with a resin-finish-layer 109. Resin-finish-layer 109 may be one or more resin finish layers. Resin-finish-layer 109 may be a polyurethane resin finish. Resin-finish-layer 109 may also include one or more additional fiberglass sheets.

Continuing discussing FIG. 1B, resin-finish-layer 109 may be covered, at least in part, by a top-deck-layer 111. Top-deck-layer 111 may form the top deck of preexisting surfboard 100. Top-deck-layer 111 may be a waterproof extruded polyethylene (IXPE) foam deck (e.g., for a beginner soft top surfboard). IXPE foam decks may be irradiated cross-linked polyethylene or the like. Top-deck-layer 111 may be an epoxy resin finish (e.g., for an EPS foam core surfboard). Top-deck-layer 111 may be a polyester resin finish (e.g., for a polyurethane foam core surfboard). Top-deck-layer 111 may include a 4 ounce (oz.) epoxy resin layer, a 4 oz. resin layer, a 4 oz. resin patch on high impact standing areas of the IXPE foam deck.

Continuing discussing FIG. 1B, foam core 101, on its bottom surface, may be covered by one to three fiberglass layers/sheets (with epoxy resin), designated fiberglass-layer 113. That is, fiberglass-layer 113 may be one to three fiberglass layers/sheets (and with epoxy resin).

Continuing discussing FIG. 1B, fiberglass-layer 113 may be covered with a resin-finish-layer 115. Resin-finish-layer 115 may be a polyurethane resin finish.

Continuing discussing FIG. 1B, resin-finish-layer 115 may be covered, at least in part, by a bottom 117. Bottom 117 may form the bottom of preexisting surfboard 100. Bottom 117 may be a layer of high-density polyethylene (HDPE) plastic. Bottom 117 may have 4 ounces (oz.) of epoxy resin plus hand placed bamboo veneer or the like plus a 4 oz. clear veneer the HDPE clear plastic finish.

Foam cores 101, especially closed cell foams and the like, of preexisting surfboards 100 however may be prone to overheating in direct sunlight (or from other sources of heat, such as a vehicle parked in direct sunlight with a preexisting surfboard 100 inside). Preexisting layers, such as fiberglass-layer 107, resin-finish-layer 109, top-deck-layer 111, fiberglass-layer 113, resin-finish-layer 115, and bottom 117 may contribute to retention of undesirable heat. Overheating of a given preexisting surfboard 100 may result in foam core 101 softening, melting, and/or liquifying resulting in a weakening of the given preexisting surfboard 100. Overheating of a given preexisting surfboard 100 may result in delamination of one or more of fiberglass-layer 107, resin-finish-layer 109, top-deck-layer 111, fiberglass-layer 113, resin-finish-layer 115, and/or bottom 117 from each other and/or from foam core 101 resulting in a weakening of the given preexisting surfboard 100. Overheating of a given preexisting surfboard 100 may result in release and/or failure at seams, such as along edges (e.g., rails 121). Overheating of a given preexisting surfboard 100 may result in generation of one or more undesirable soft spots in the given preexisting surfboard 100. All in all, overheating of a given preexisting surfboard 100 may result in loss of strength, water intrusion, board breakage, loss of performance, a surfboard unfit for its intended purpose, board failures, weak spots, soft spots, delaminations, seam failures, combinations thereof, and/or the like.

Figure 2A:
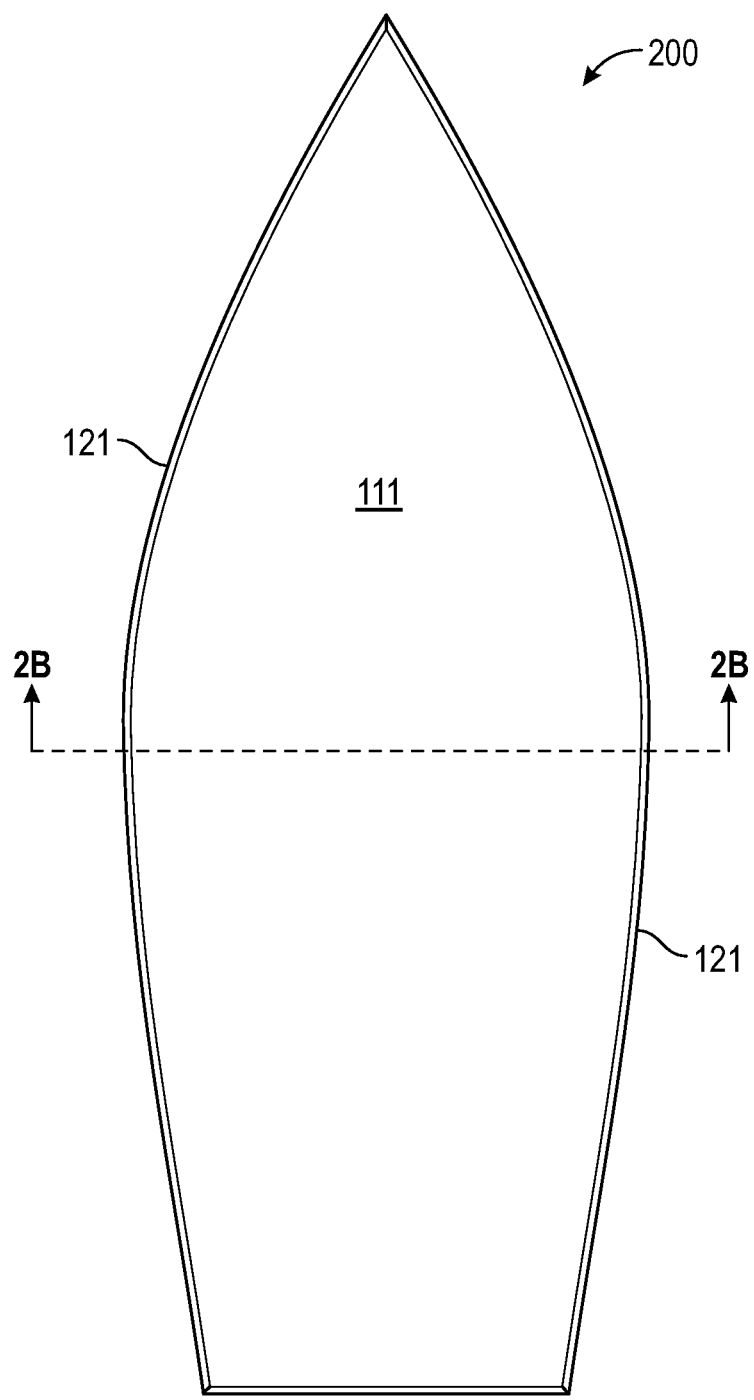
FIG. 2A may depict a top view of a new type of surfboard 200.
Figure 2B:
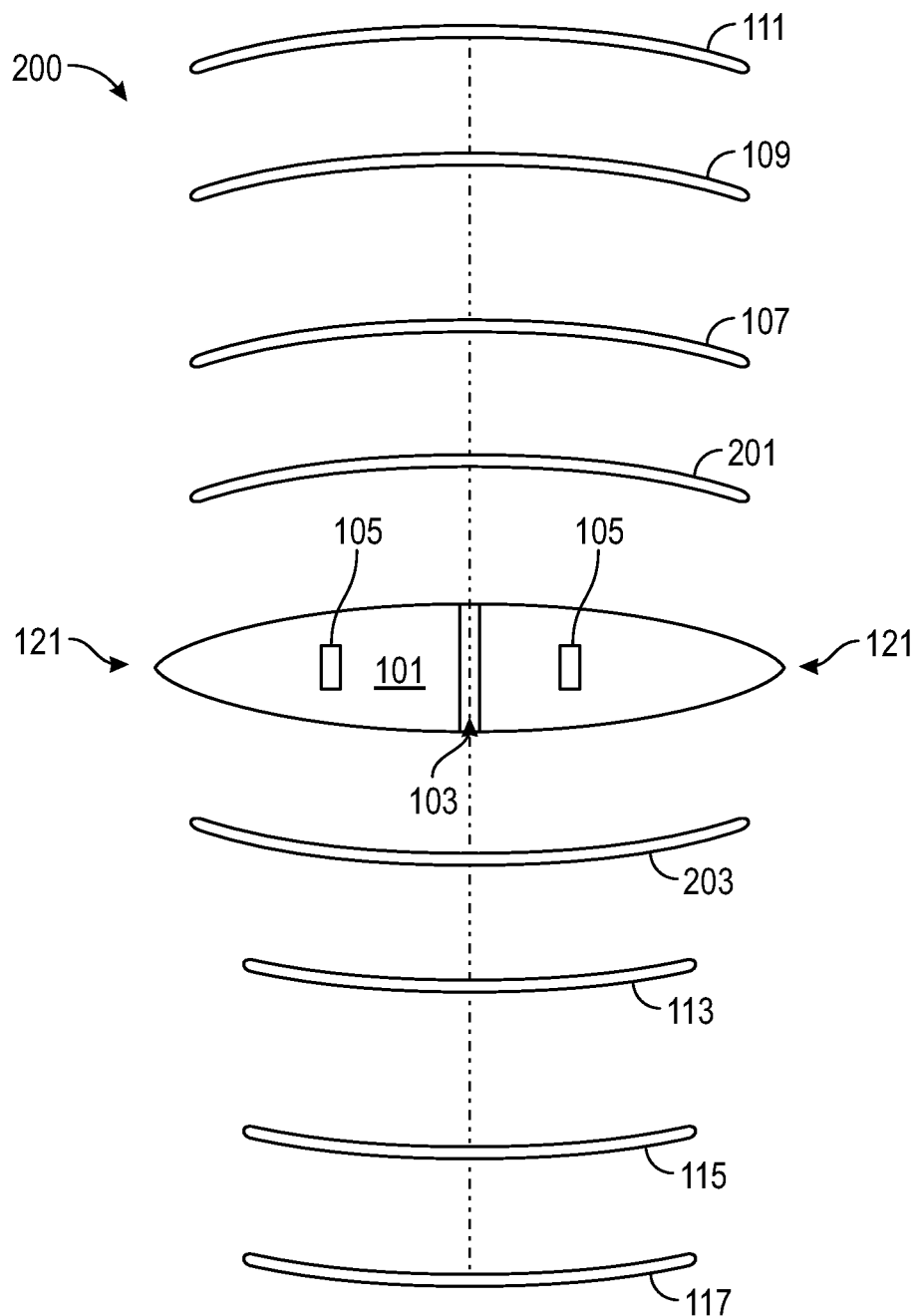
FIG. 2B may be an exploded cross-sectional view along sectional line 2B-2B of FIG. 2A.

FIG. 2A may depict a top view of a new type of surfboard 200. FIG. 2A may show an upper portion of top-deck-layer 111 of surfboard 200. Rails 121 (a pair of rails 121) may run along longitudinal sides of surfboard 200. FIG. 2A may also show sectional line 2B-2B going across a transverse width of surfboard 200. FIG. 2B may be an exploded cross-sectional view along sectional line 2B-2B of FIG. 2A.

Continuing discussing FIG. 2B, in some embodiments, surfboard 200 may comprise foam core 101. In some embodiments, foam core 101 may be selected from one or more foams of: expanded polystyrene (EPS), polyurethane (PU), extruded polystyrene (XPS), combinations thereof, and/or the like. In some embodiments, foam core 101 may be open celled, closed celled, combinations thereof, and/or the like. In some embodiments, foam core 101 may be of a foam core blank that may be cut, milled, sanded, and/or shaped into a more desirable surfboard shape. In some embodiments, foam core 101 may be an output from a coffin foam compression operation.

Continuing discussing FIG. 2B, in some embodiments, foam core 101 may comprise one or more stringers. In some embodiments, a given stringer may be an elongate member. In some embodiments, foam core 101 may comprise one or more central-stringers 103. In some embodiments, a given central-stringer 103 may be located centrally located in foam core 101 and may run in a longitudinal direction of surfboard 200 from a tail end to towards a nose/tip end of surfboard 200. In some embodiments, a given central-stringer 103 may run continuously from the tail end to towards the nose/tip end of surfboard 200. In some embodiments, two or more central-stringers 103 may run from the tail end to towards the nose/tip end of surfboard 200 with a gap or a break between each such central-stringers 103. In some embodiments, central-stringer 103 may be located entirely within foam core 101. In some embodiments, portions of central-stringer 103 be exposed at a top and/or at a bottom of foam core 101. In some embodiments, foam core 101 may comprise a pair of substantially parallel side-stringers 105. In some embodiments, side-stringers 105 may run substantially in a longitudinal direction from the tail to the nose/tip of the given surfboard 200. In some embodiments, side-stringers 105 may be continuous from the tail to the nose/tip of the given surfboard 200, running in a substantially longitudinal direction of the given surfboard 200. In some embodiments, side-stringers 105 may be non-continuous from the tail to the nose/tip of the given surfboard 200, with one or more gaps/breaks between side-stringers 105, running in a substantially longitudinal direction of the given surfboard 200. In some embodiments, side-stringer 105 may be located entirely within foam core 101. In some embodiments, portions of side-stringer 105 be exposed at a top and/or at a bottom of foam core 101. In some embodiments, foam core 101 may comprise at least one central-stringer 103 and at least two side-stringers 105, wherein the at least one central-stringer 103 may be disposed between the at least two side-stringers 105. In some embodiments, the stringer(s) of the given foam core 101 may provide strength, structural reinforcement, rigidity, combinations thereof, and/or the like to foam core 101.

Continuing discussing FIG. 2B, in some embodiments, surfboard 200 may comprise top-structural-layer 201. In some embodiments, top-structural-layer 201 may be disposed between a top of foam core 101 and a bottom of fiberglass-layer 107. In some embodiments, top-structurallayer 201 may be one or more of: attached to, adhere to, vacuum adhered to, glued to, bonded to, welded to, combinations thereof, and/or the like, the top of foam core 101. In some embodiments, top-structural-layer 201 may be adhered to the top of foam core 101 using a resin (e.g., an epoxy resin). In some embodiments, top-structural-layer 201 may cover all or a portion of the top of foam core 101. In some embodiments, top-structural-layer 201 may be one or more of: attached to, adhere to, vacuum adhered to, glued to, bonded to, welded to, combinations thereof, and/or the like, with respect to the top of a given stringer (e.g., central-stringer 103 and/or side-stringer 105). In some embodiments, top-structural-layer 201 may be adhered to the top of a given stringer (e.g., central-stringer 103 and/or side-stringer 105). In some embodiments, top-structural-layer 201 may provide increased/additional strength, structural reinforcement, heat shielding, combinations thereof, and/or the like to surfboard 200 as compared to preexisting surfboard 100 that is without any such top-structural-layer 201. In some embodiments, a top layer of top-structural-layer 201 may be substantially reflective to help reflect heat away from foam core 101. In some embodiments, top-structural-layer 201 may be comprised of one or more of: wood (e.g., bamboo), treated wood, metal, plastic, woven, combinations thereof, and/or the like—in a sheet, a veneer, a foil, a layer, a mesh, a screen, combinations thereof, and/or the like, format.

Continuing discussing FIG. 2B, in some embodiments of surfboard 200, attached to a top of top-structural-layer 201 may then be fiberglass-layer 107. However, in some embodiments, fiberglass-layer 107 in surfboard 200 may be of less fiberglass material than fiberglass-layer 107 in preexisting surfboard 100. In some embodiments of surfboard 200, attached to a top of fiberglass-layer 107 may be resin-finish-layer 109. In some embodiments of surfboard 200, attached to a top of resin-finish-layer 109 may be top-deck-layer 111.

In some embodiments, surfboard 200 may comprise top-deck-layer 111 that may be attached to an exterior region of the at least one resin-finish-layer 109. In some embodiments, top-deck-layer 111 may be configured to removably receive a portion of a body weight of a surfer during surfing without substantial deformation of the top-deck-layer 111.

Continuing discussing FIG. 2B, in some embodiments, surfboard 200 may comprise bottom-structural-layer 203. In some embodiments, bottom-structural-layer 203 may be disposed between a bottom of foam core 101 and a top of fiberglass-layer 113. In some embodiments, bottom-structural-layer 203 may be one or more of: attached to, adhere to, vacuum adhered to, glued to, bonded to, welded to, combinations thereof, and/or the like, the bottom of foam core 101. In some embodiments, bottom-structural-layer 203 may be adhered to the bottom of foam core 101 using a resin (e.g., an epoxy resin). In some embodiments, bottom-structural-layer 203 may cover all or a portion of the bottom of foam core 101. In some embodiments, bottom-structural-layer 203 may be one or more of: attached to, adhere to, vacuum adhered to, glued to, bonded to, welded to, combinations thereof, and/or the like, with respect to the bottom of a given stringer (e.g., central-stringer 103 and/or side-stringer 103). In some embodiments, bottom-structural-layer 203 may be adhered to the bottom of a given stringer (e.g., central-stringer 103 and/or side-stringer 105). In some embodiments, bottom-structural-layer 203 may provide increased/additional strength, structural reinforcement, heat shielding, combinations thereof, and/or the like to surfboard 200 as compared to preexisting surfboard 100 that is without any such bottom-structural-layer 203. In some embodiments, a bottom layer of bottom-structural-layer 203 may be substantially reflective to help reflect heat away from foam core 101. In some embodiments, bottom-structural-layer 203 may be comprised of one or more of: wood (e.g., bamboo), treated wood, metal, plastic, woven, combinations thereof, and/or the like—in a sheet, a veneer, a foil, a layer, a mesh, a screen, combinations thereof, and/or the like, format.

In some embodiments, top-structural-layer 201 and bottom-structural-layer 203 may be attached to a given stringer (e.g., central-stringer 103), with that given stringer disposed between top-structural-layer 201 and bottom-structural-layer 203, wherein this combined structure may function structurally as an I-beam, and may be I-beam shaped in cross-section, with the stem portion of the "I" being formed from the given stringer, the upper brackets (or upper bilateral serifs) of the "I" being formed from top-structural-layer 201, and the lower brackets (or lower bilateral serifs) of the "I" being formed from bottom-structural-layer 203.

Continuing discussing FIG. 2B, in some embodiments of surfboard 200, attached to a bottom of bottom-structural-layer 203 may then be fiberglass-layer 113. However, in some embodiments, fiberglass-layer 113 in surfboard 200 may be of less fiberglass material than fiberglass-layer 113 in preexisting surfboard 100. In some embodiments of surfboard 200, attached to a bottom of fiberglass-layer 113 may be resin-finish-layer 115. In some embodiments of surfboard 200, attached to a bottom of resin-finish-layer 115 may be bottom 117.

In some embodiments, surfboard 200 may comprise at least one structural-layer (e.g., 201, 203, or both 201 and 203) that may be disposed between foam core 101 and fiberglass layers (e.g., 107, 113, or both 107 and 113) of surfboard 200, wherein the at least one structural-layer may be attached to foam core 101 and attached to the fiberglass layers (e.g., 107, 113, or both 107 and 113). In some embodiments, the at least one structural-layer (e.g., 201, 203, or both 201 and 203) may be closer to foam core 101 than any other layers of surfboard 200.\

In some embodiments, surfboard 200 may comprise: foam core 101; at least one structural-layer (e.g., 201, 203, or both 201 and 203); at least one fiberglass-layer (e.g., 107, 113, or both 113 and 107); and at least one resin-finish-layer (e.g., 109, 115, or both 109 and 115). In some embodiments, foam core 101 may be with at least one stringer (e.g., 103, 105, or both 103 and 105). In some embodiments, the at least one structural-layer (e.g., 201, 203, or both 201 and 203) may be attached to an exterior region of foam core 101. In some embodiments, the at least one structural-layer (e.g., 201, 203, or both 201 and 203) may be comprised of at least one sheet of: plastic, metal, or wood, combinations thereof, and/or the like. In some embodiments, the at least one fiberglass-layer (e.g., 107, 113, or both 113 and 107) may be attached to an exterior region of the at least one structural-layer (e.g., 201, 203, or both 201 and 203). In some embodiments, the at least one resin-finish-layer (e.g., 109, 115, or both 109 and 115) may be attached to an exterior region of the at least one fiberglass-layer (e.g., 107, 113, or both 113 and 107). In some embodiments, the attachment of the at least one structural-layer (e.g., 201, 203, or both 201 and 203) to the exterior region of foam core 101 may provide structural strength to surfboard 200 that is greater as compared to surfboards without the at least one structural-layer (e.g., 201, 203, or both 201 and 203).

In some embodiments, the at least one structural-layer (e.g., 201, 203, or both 201 and 203) may have a predetermined thickness. In some embodiments, the at least one structural-layer (e.g., 201, 203, or both 201 and 203) may have a thickness from 0.001 inches to 0.10 inches.

In some embodiments, the at least one structural-layer (e.g., 201, 203, or both 201 and 203) may comprise a reflective film that reflects at least some electromagnetic energy away from foam core 101 when surfboard 200 (or 300) may be exposed to sunlight.

In some embodiments, the exterior region of foam core 101 that may have the at least one structural-layer to it may be a top of foam core 101, in which case the at least one structural-layer may be at least top-structural-layer 201. In some embodiments, the exterior region of foam core 101 that may have the at least one structural-layer to it may be a bottom of foam core 101, in which case the at least one structural-layer may be at least bottom-structural-layer 203. In some embodiments, the exterior region of foam core 101 that may have the at least one structural-layer to it may be both a top and a bottom of foam core 101, in which case the at least one structural-layer may be at least top-structural-layer 201 (attached to the top of foam core 101) and at least bottom-structural-layer 203 (attached to the bottom of foam core 101).

Continuing discussing FIG. 2B, in some embodiments, surfboard 200 may comprise foam core 101, at least one stringer, fiberglass-layer 107, resin-finish-layer 109, top-deck-layer 111, fiberglass-layer 113, resin-finish-layer 115, bottom 117, at least one of top-structural-layer 201 or of bottom-structural-layer 203, or both top-structural-layer 201 and bottom-structural-layer 203.

In some embodiments, surfboard 200 (and/or surfboard 200) may further comprise at least one heat-release-valve 301 that may be configured to release heat, pressure, gas, liquid, combinations thereof, and/or the like from foam core 101 when a temperature of foam core 101 exceeds (or reaches) a predetermined temperature.

Figure 3A:
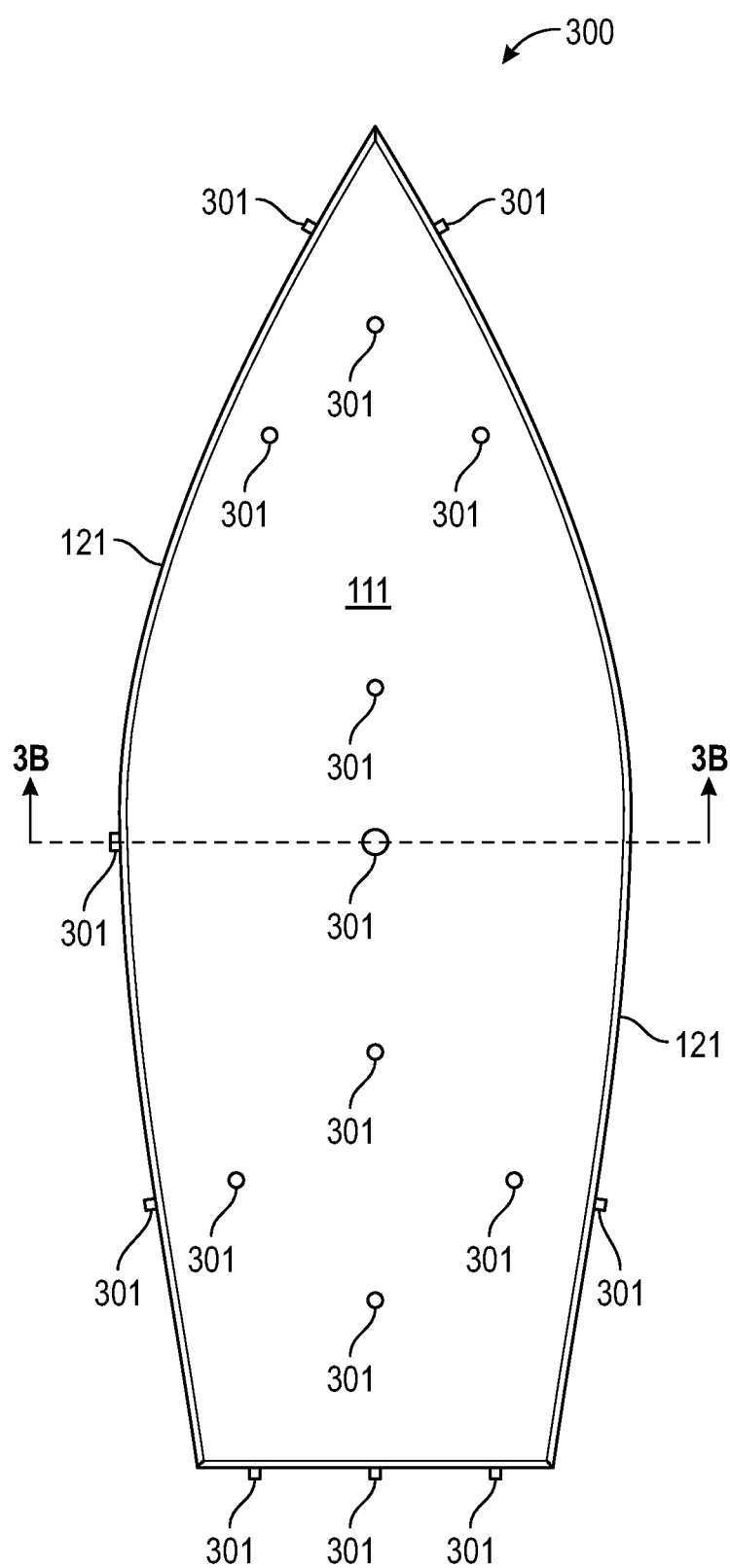
FIG. 3A may depict a top view of a new type of surfboard 300.
Figure 3B:
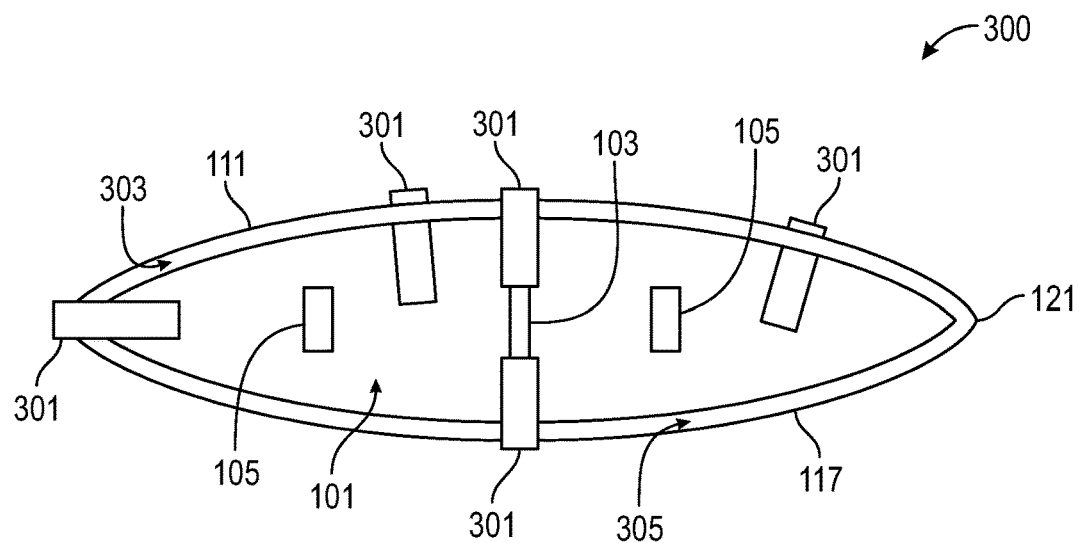
FIG. 3B may be a cross-sectional view along sectional line 3B-3B of FIG. 3A.

FIG. 3A may depict a top view of a new type of surfboard 300. FIG. 3A may show an upper portion of top-deck-layer 111 of surfboard 300. Rails 121 may run along longitudinal sides of surfboard 300. FIG. 3A may also show sectional line 3B-3B going across a transverse width of surfboard 300. FIG. 3B may be a cross-sectional view along sectional line 3B-3B of FIG. 3A. In some embodiments, surfboard 300 may be surfboard for minimizing/preventing overheating of the surfboard (e.g., by at least one heat-release-valve 301 and/or by reflective films).

Continuing discussing FIG. 3A, in some embodiments, surfboard 300 may comprise at least one heat-release-valve 301. In some embodiments, the at least one heat-release-valve 301 may comprise an exterior end (e.g., an external portion) and a distal end (e.g., an internal portion/end). In some embodiments, for a given heat-release-valve 301, the distal end (e.g., an internal portion/end) may be disposed opposite of the exterior end (e.g., an external portion). In some embodiments, the exterior end (e.g., an external portion) of the given heat-release-valve 301 may be located on an exterior surface of surfboard 300. In some embodiments, the distal end (e.g., an internal portion/end) of the given heat-release-valve 301 may physically contact at least a portion of foam core 101 of surfboard 300. In some embodiments, the at least one heat-release-valve 301 may be configured to release heat, pressure, gas, and/or liquid from an interior of surfboard 300 (e.g., from foam core 101) when the interior of the surfboard 300 may exceed or reach a predetermined temperature and/or a predetermined pressure.

Continuing discussing FIG. 3A, in some embodiments, surfboard 300 may comprise at least one heat-release-valve 301. In some embodiments, at least a portion of at least one heat-release-valve 301 may be located on an exterior surface of surfboard 300, such as, but not limited to: on a rail 121; along a longitudinal center line; along a transverse width line; on an exterior of top-deck-layer 111; on an exterior of bottom 117; on an exterior upper half; on an exterior upper third; on a bottom half; on a bottom third; proximate to a nose/tip (e.g., within six inches of the nose-tip); proximate to a tail end (e.g., within six inches of the tail end); on the tail end; part of a fin box; asymmetrically located; located to minimize interaction (physical contact) with knees of the surfer during paddling; located to minimize interaction (physical contact) with the knees and feet of the surfer during standing on the exterior of top-deck-layer 111; located to minimize interaction (physical contact) with arms and hands of the surfer during paddling; located to minimize interaction (physical contact) with wax (surf wax) placed onto an exterior of top-deck-layer 111 (so the wax does not block operation of the given heat-release-valve 301); combinations thereof; and/or the like of surfboard 300.

FIG. 3B may show a given heat-release-valve 301 extending from an external/exterior/outer most surface of surfboard 300 into foam core 101. FIG. 3B may show cross-sections of plurality of top layers 303 and of plurality of bottom layers 305. In some embodiments, plurality of top layers 303 may be a combination of one or more of: top-structural-layer 201, fiberglass-layer 107, resin-finish-layer 109, and/or interior portions of top-deck-layer 111. In some embodiments, plurality of bottom layers 305 may be a combination of one or more of: bottom-structural-layer 203, fiberglass-layer 113, resin-finish-layer 115, and/or interior portions of bottom 117.

Continuing discussing FIG. 3B, in some embodiments, a given heat-release-valve 301 attached to surfboard 300 may have an exterior end (e.g., external portion) and a distal end (e.g., internal portion/end). In some embodiments, the distal end may be disposed opposite of the exterior end. In some embodiments, the exterior end location(s) of the given heat-release-valve 301 on surfboard 300 may be as described above. In some embodiments, the distal end of the given heat-release-valve 301 may be physically touching foam core 101. In some embodiments, the distal end of the given heat-release-valve 301 may be physically inserted into foam core 101.

In some embodiments, a given heat-release-valve 301 attached to surfboard 300 may have a purpose of releasing: heat, temperature, pressure, combinations thereof, and/or the like from foam core 101 to minimize and/or prevent undesirable excessive heat, temperature, pressure, combinations thereof, and/or the like within foam core 101. In some embodiments, given heat-release-valve 301 attached to surfboard 300 may minimize and/or prevent the problems noted above associated with an overheated surfboard (e.g., preexisting surfboard 100) without the at least one heat-release-valve 301.

In some embodiments, a given heat-release-valve 301 attached to surfboard 300 may be a check-valve configured to not let water into interior portions of surfboard 300, but may allow gasses and/or liquids within interiors of surfboard 300 to escape surfboard 300. In some embodiments, the given heat-release-valve 301 attached to surfboard 300 may be a pop-up pressure relief valve. In some embodiments, a given heat-release-valve 301 may have a spring that in a default closed position pushes a valve gate against a valve seat keeping outside air and water from entering internals of surfboard 300; but when internal pressures, heat, and/or temperature rises inside of surfboard 300 above a predetermined threshold that the spring is configured/made for, the internal pressure may unseat the gate from the seat, opening the given heat-release-valve 301, allowing internal heat, pressure, gas, and/or liquids to escape (vent) out from heat-release-valve 301 and into the local surrounding atmosphere.

In some embodiments, when the temperature of foam core 101 may be below the predetermined temperature of foam core 101, the at least one heat-release-valve 101 may be closed, minimizing/preventing entry of water (e.g., ocean water), that is external to the surfboard 300, from getting into foam core 101. In some embodiments, when the temperature of foam core 101 may be below the predetermined temperature of foam core 101, outer-gate 405 may be sealed against outer-seat 415. In some embodiments, when the temperature of foam core 101 may be below the predetermined temperature of foam core 101, inner-gate 407 may be sealed against inner-seat 417. In some embodiments, when the temperature of foam core 101 may be below the predetermined temperature of foam core 101, all gates of a given heat-release-valve 301 may be sealed against their respective seats.

Figure 4:
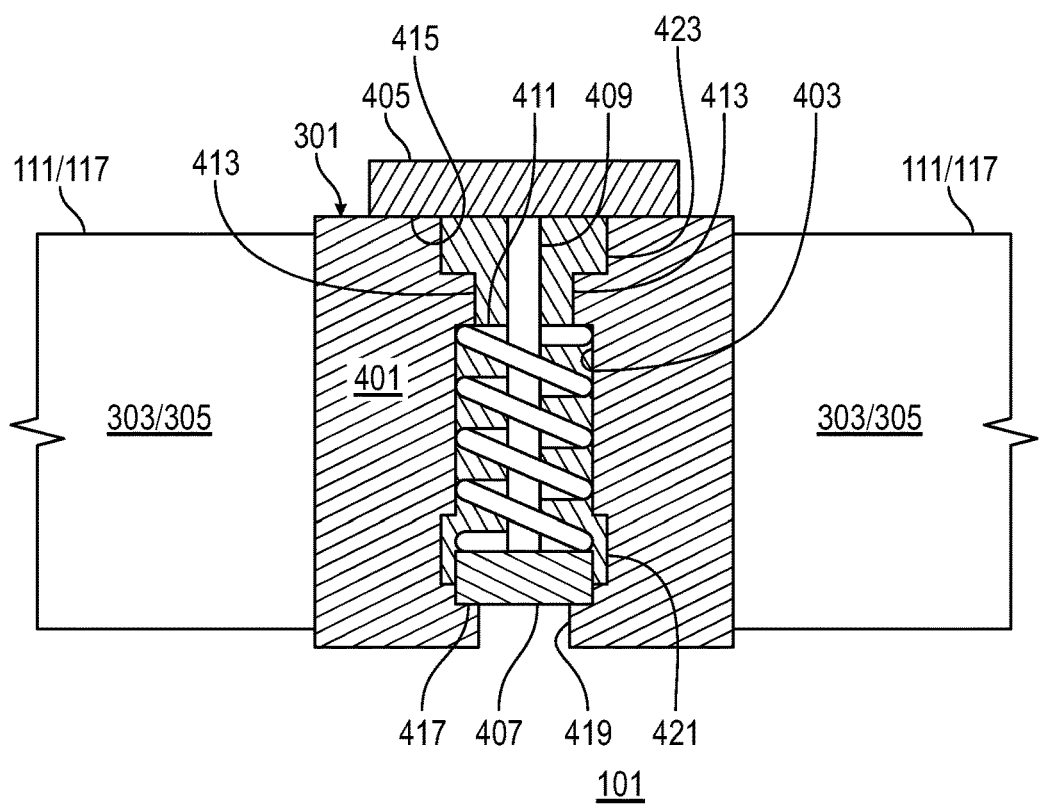
FIG. 4 may depict a cross-sectional view of a heat-release-valve installed in a portion of a surfboard.

FIG. 4 may depict a cross-sectional view through a given at least one heat-release-valve 301 that may be embedded within surfboard 300. In some embodiments, at least one heat-release-valve 301 may be embedded within surfboard 300 such that a portion of at least one heat-release-valve 301 may be accessible/visible from top-deck-layer 111/bottom 117 and an opposing portion of at least one heat-release-valve 301 may be in physical contact with at least some portion of foam core 101.

Continuing discussing FIG. 4, in some embodiments, at least one heat-release-valve 301 may comprise at least one housing 401. In some embodiments, at least one housing 401 may be inserted/embedded within surfboard 300. In some embodiments, at least one housing 401 may be inserted/embedded within plurality of top layers 303/plurality of bottom layers 305. In some embodiments, at least one housing 401 may be substantially (mostly) inserted/embedded within plurality of top layers 303/plurality of bottom layers 305. In some embodiments, a given housing 401 may have fins, protrusions, and/or extrusions extending outwards from a radial center of housing at least one heat-release-valve 301 to aid in valve at least one heat-release-valve 301 being anchored in plurality of top layers 303/plurality of bottom layers 305. In some embodiments, at least one housing 401 may be a structural member for housing other components of at least one heat-release-valve 301, such as, but not limited to, one or more of: inner-gate 407 (with or without gaskets/O-rings), shaft 409; biasing member(s) (e.g., spring 411), combinations thereof, and/or the like. In some embodiments, at least one housing 401 may be substantially cylindrical member. In some embodiments, at least one housing 401 may have at least one through hole, running substantially parallel with a longitude of housing 401. In some embodiments, the at least one through hole may have different diameters (e.g., different inner diameters of housing 401). In some embodiments, the at least one through hole may comprise a cavity 403. In some embodiments, the at least one through hole may be cavity 403.

In some embodiments, at least a portion of housing 401 may be inserted and fixedly anchored into the plurality of top layers 303. In some embodiments, at least a majority of housing 401 may be inserted and fixedly anchored into the plurality of top layers 303. In some embodiments, at least a portion of housing 401 may be inserted and fixedly anchored into the plurality of bottom layers 305. In some embodiments, at least a majority of housing 401 may be inserted and fixedly anchored into the plurality of bottom layers 305. In some embodiments, surfboard 300 may comprise a pair of rails 121 running down longitudinal sides of surfboard 300. In some embodiments, at least a portion of housing 401 may be inserted and anchored into at least one rail 121 of the pair of rails 121. In some embodiments, at least a majority of housing 401 may be inserted and anchored into at least one rail 121 of the pair of rails 121.

In some embodiments, housing 401 may be a substantially cylindrical member with at least one internal through cavity 403, wherein the at least one internal through cavity 403 may link the internal portion of heat-release-valve 301 to the external portion of heat-release-valve 301.

Continuing discussing FIG. 4, in some embodiments, cavity 403 may have two opposing openings, inner-opening 419 and external-opening 423, respectively. In some embodiments, inner-opening 419 may be disposed opposite from external-opening 423. In some embodiments, when at least one heat-release-valve 301 may be installed in a given region/portion of plurality of top layers 303/plurality of bottom layers 305, then inner-opening 419 may be facing foam core 101. In some embodiments, when at least one heat-release-valve 301 may be installed in a given region/portion of plurality of top layers 303/plurality of bottom layers 305, then external-opening 423 may be facing the environment external to surfboard 300. In some embodiments, inner-opening 419 may have an inner diameter that is smaller than an outside diameter of inner-gate 407. In some embodiments, external-opening 423 may have an inner diameter that may be larger than an inside diameter of a spring-stop 413.

Continuing discussing FIG. 4, in some embodiments, at least one heat-release-valve 301 may comprise a shaft 409 that may be an elongate cylindrical member with two opposing terminal ends, wherein each terminal end may end in a gate member/structure. In some embodiments, one end of shaft 409 may end at outer-gate 405. In some embodiments, one end of shaft 409 may be attached to outer-gate 405. In some embodiments, the other end of shaft 409 (i.e., the opposing end) may end at inner-gate 407. In some embodiments, the other end of shaft 409 (i.e., the opposing end) may be attached to inner-gate 407. In some embodiments, when outer-gate 405 may be touching against an outer-seat 415 of at least one heat-release-valve 301, shaft 409 may be entirely within cavity 403. In some embodiments, inner-gate 407 may be within cavity 403. In some embodiments, outer-gate 405 may be a substantially cylindrical/disc like member, with portions configured to seal against outer-seat 415. In some embodiments, outer-gate 405 may comprise one or more gaskets, O-rings, combinations thereof, and/or the like for sealing against outer-seat 415. In some embodiments, inner-gate 407 may be a substantially cylindrical/disc like member, with portions configured to seal against inner-seat 417. In some embodiments, inner-gate 407 may comprise one or more gaskets, O-rings, combinations thereof, and/or the like for sealing against inner-seat 417. In some embodiments, an outside diameter of outer-gate 405 may be larger, smaller, the same, or substantially the same as an outside diameter of inner-gate 407. In some embodiments, outer-seat 415 may be an external portion of housing 401 configured to removably seal up against a portion of outer-gate 405. In some embodiments, outer-seat 415 may be fitted with a gasket. In some embodiments, inner-seat 417 may be a portion of cavity 403 (e.g., proximate to inner-opening 419) that may be configured to removably seal up against a portion of inner-gate 407. In some embodiments, inner-seat 417 may be fitted with a gasket.

Continuing discussing FIG. 4, in some embodiments, cavity 403 may comprise at least one region/portion with a narrowed inside diameter, that may function as a spring-stop 413. In some embodiments, spring-stop 413 may have an inside diameter larger than an outside diameter of shaft 409 but smaller than an outside diameter of spring 411. In some embodiments, spring-stop 413 may prevent a terminal end of spring 411 from pushing out of cavity 403. In some embodiments, spring-stop 413 may be located in cavity 403. In some embodiments, spring-stop 413 may be at least two projections extending into cavity 403. In some embodiments, spring-stop 413 may be located closer to outer-seat 415 than to inner-seat 417. In some embodiments, spring-stop 413 may be located closer to outer-seat 415 than to inner-opening 419. In some embodiments, spring 411 may be disposed within cavity 403. In some embodiments, spring 411 may be a helical coil spring. In some embodiments, spring 411 may be a hollow cylindrical member configured as a helical coil spring. In some embodiments, spring 411 may have two opposing terminal ends. In some embodiments, one terminal end of spring 411 may be in physical contact with spring-stop 413 and the opposing terminal end of spring 411 may be in physical contact with a portion of inner-gate 407, with shaft 409 running a center of spring 411. In some embodiments, spring 411 may have two opposing terminal ends. In some embodiments, one terminal end of spring 411 may be pushing against spring-stop 413 and the opposing terminal end of spring 411 may be pushing against a portion of inner-gate 407, with shaft 409 running a center of spring 411.

Continuing discussing FIG. 4, in some embodiments, cavity 403 may comprise at least one region/portion with an enlarged inside diameter, that may function as a pathway 421. In some embodiments, pathway 421 may be a fluid (liquid and/or gas) pathway. In some embodiments, pathway 421 may be configured to allow passage of some foam core 101 liquids and/or gasses when inner-gate 407 may be moved away from inner-seat 417 at least a predetermined distance. In some embodiments, pathway 421 may be an extension into housing 401 material. In some embodiments, pathway 421 may extend partially into housing 401 material. In some embodiments, pathway 421 may cut into housing 401 material. In some embodiments, pathway 421 may be disposed opposite from spring-stop 413. In some embodiments, when pressure and/or heat of foam core 101 increases above a predetermined threshold, inner-gate 407 will move away from inner-seat 417, further compressing spring 411, moving outer-gate 405 away from outer-seat 415, exposing an external-hole 423, and allowing liquid and/or gaseous fluids in foam core 101 to vent through inner-opening 419, to now exposed pathway 421, through cavity 403, and out an external-hole 423. In some embodiments, when pressure and/or heat of foam core 101 may be below a predetermined threshold, then a portion of inner-gate 407 may seal against inner-seat 417, preventing liquids and/or gasses in foam core 101 from venting to the external atmosphere.

Continuing discussing FIG. 4, in some embodiments, when pressure and/or heat of foam core 101 may be below a predetermined threshold, then a portion of outer-gate 405 may seal against outer-seat 415, preventing external water (e.g., saltwater) from getting into foam core 101 through heat-release-valve 301. In some embodiments, when pressure and/or heat of foam core 101 may be below a predetermined threshold, then spring 411 may press against both spring-stop 413 and inner-gate 407 sufficiently hard that a portion of inner-gate 407 may seal up against inner-seal 417; and a portion of outer-gate 405 may seal up against outer-seal 415. In some embodiments, spring 411 resistance characteristics (e.g., a predetermined spring constant) may be configured in relation to the predetermined threshold of pressure, heat, and/or temperature inside of foam core 101. In some embodiments, spring 411 resistance characteristics (e.g., a predetermined spring constant) may be sized in relation to the predetermined threshold of pressure, heat, and/or temperature inside of foam core 101. In some embodiments, the predetermined threshold of pressure, heat, and/or temperature inside of foam core 101 may be a pressure, heat, and/or temperature inside of foam core 101 below where damage to surfboard 300 starts to occur.

In some embodiments, housing 401, shaft 409, outer-gate 405, inner-gate 407, spring 411 may be comprised of rigid to semi-rigid material(s) of construction. In some embodiments, housing 401, shaft 409, outer-gate 405, inner-gate 407, spring 411 may be comprised of one or more: metals (e.g., stainless steel), plastics, combinations thereof, and/or the like. In some embodiments, gaskets and/or O-rings of heat-release-valve 301 may be substantially comprises of one or more: elastomers, rubbers (natural and/or synthetic), silicones, plastics, combinations thereof, and/or the like.

In some embodiments, surfboard 300 may comprise one or more fin boxes 501 attached to bottom 117 (near/proximate to the tail). In some embodiments, one or more fin boxes 501 may be inserted, attached to, and/or fixedly anchored to plurality of bottom layers 305. In some embodiments, a given fin box 501 may be configured to removably receive at least one fin. That is, a given fin box 501 may be how a given fin may be attached to surfboard 300.

Figure 5:
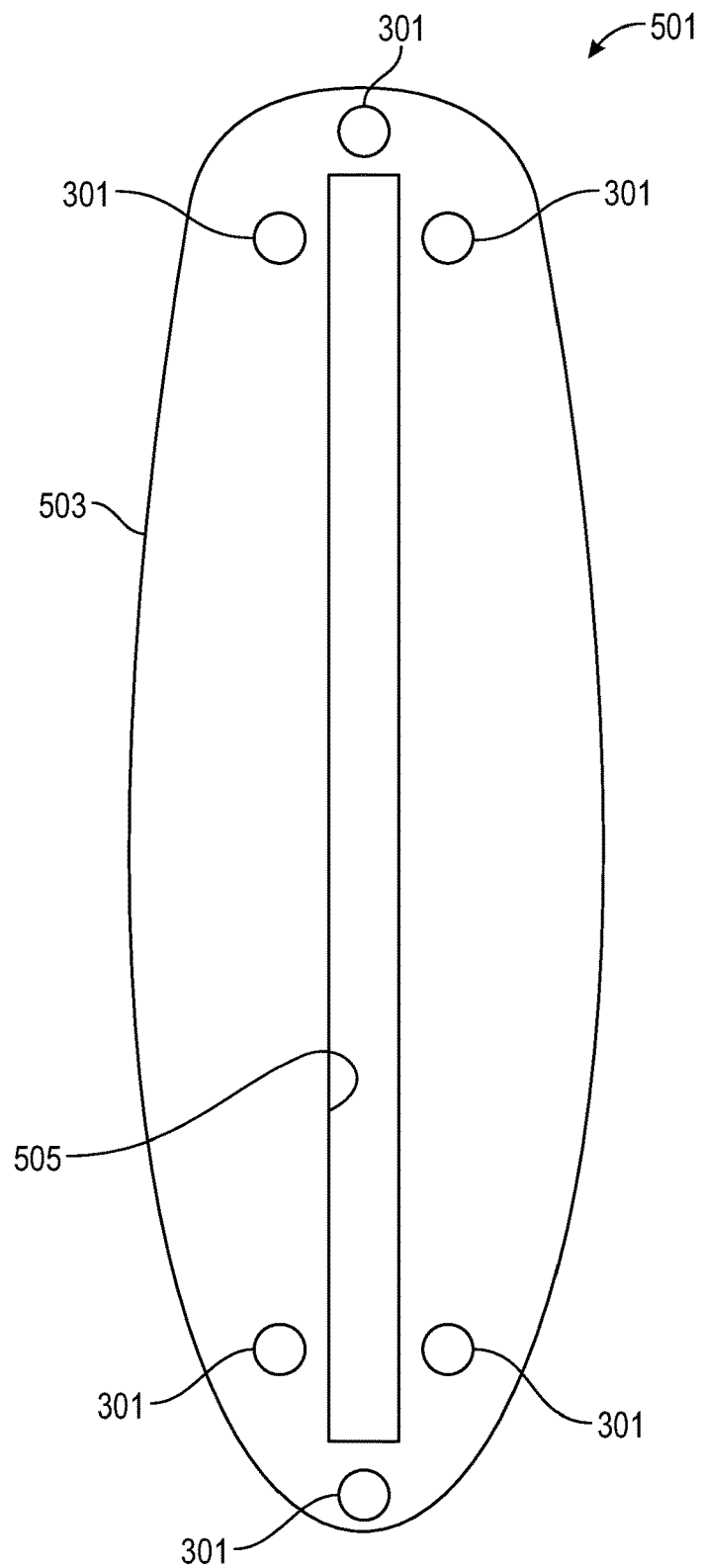
FIG. 5 may depict a bottom plan view of a fin box with at least one heat-release-valve as part of the fin box.

FIG. 5 may show a bottom plan view (e.g., with respect to viewing surfboard 300 from its bottom 117) of a given fin box 501. In some embodiments, a given fin box 501 may comprise a flange 503 and within that flange 503 a slot-for-fin-base 505. In some embodiments, at least one fin, a base of that fin in particular, may be removably inserted and/or attached to the insides of slot-for-fin-base 505. In some embodiments, given fin box 501 may comprise at least one heat-release-valve 301. In some embodiments, the at least one heat-release-valve 301 may be attached to, inserted into, anchored to, and/or part of flange 503.

In some embodiments, surfboard 300 may comprise foam core 101, at least one stringer, fiberglass-layer 107, resin-finish-layer 109, top-deck-layer 111, fiberglass-layer 113, resin-finish-layer 115, bottom 117, at least one heat-release-valve 301, at least one of top-structural-layer 201 or of bottom-structural-layer 203, or both top-structural-layer 201 and bottom-structural-layer 203, or no top-structural-layer 201 and no bottom-structural-layer 203. In some embodiments, surfboard 300 may comprise at least one fin box 501. In some embodiments, the at least one fin box 501 may comprise at least one heat-release-valve 301.

In some embodiments, surfboard 300 may comprise at least one structural-layer (e.g., 201, 203, or both 201 and 203) and at least one heat-release-valve 301. In some embodiments, the at least one structural-layer (e.g., 201, 203, or both 201 and 203) may be disposed between foam core 101 and fiberglass layers (e.g., 107, 113, or both 107 and 113) of surfboard 300, wherein the at least one structural-layer may be attached to foam core 101 and attached to the fiberglass layers (e.g., 107, 113, or both 107 and 113). In some embodiments, the at least one structural-layer (e.g., 201, 203, or both 201 and 203) may be closer to foam core 101 than any other layers of surfboard 200. In some embodiments, the at least one heat-release-valve 301 may comprise an exterior end (e.g., an external portion) and a distal end (e.g., an internal portion/end). In some embodiments, for a given heat-release-valve 301, the distal end (e.g., an internal portion/end) may be disposed opposite of the exterior end (e.g., an external portion). In some embodiments, the exterior end (e.g., an external portion) of the given heat-release-valve 301 may be located on an exterior surface of surfboard 300. In some embodiments, the distal end (e.g., an internal portion/end) of the given heat-release-valve 301 may physically contact at least a portion of foam core 101 of surfboard 300. In some embodiments, the at least one heat-release-valve 301 may be configured to release heat, pressure, gas, and/or liquid from an interior of surfboard 300 (e.g., from foam core 101) when the interior of the surfboard 300 may exceed or reach a predetermined temperature and/or a predetermined pressure.

In some embodiments, surfboard 200 may comprise: foam core 101; at least one structural-layer (e.g., 201, 203, or both 201 and 203); at least one fiberglass-layer (e.g., 107, 113, or both 113 and 107); at least one resin-finish-layer (e.g., 109, 115, or both 109 and 115); and at least one heat-release-valve 301. In some embodiments, foam core 101 may be with at least one stringer (e.g., 103, 105, or both 103 and 105). In some embodiments, the at least one structural-layer (e.g., 201, 203, or both 201 and 203) may be attached to an exterior region of foam core 101. In some embodiments, the at least one structural-layer (e.g., 201, 203, or both 201 and 203) may be comprised of at least one sheet of: plastic, metal, or wood, combinations thereof, and/or the like. In some embodiments, the at least one fiberglass-layer (e.g., 107, 113, or both 113 and 107) may be attached to an exterior region of the at least one structural-layer (e.g., 201, 203, or both 201 and 203). In some embodiments, the at least one resin-finish-layer (e.g., 109, 115, or both 109 and 115) may be attached to an exterior region of the at least one fiberglass-layer (e.g., 107, 113, or both 113 and 107). In some embodiments, the attachment of the at least one structural-layer (e.g., 201, 203, or both 201 and 203) to the exterior region of foam core 101 may provide structural strength to surfboard 200 that is greater as compared to surfboards without the at least one structural-layer (e.g., 201, 203, or both 201 and 203).

In some embodiments, surfboard 300 may comprise: foam core 101, a plurality of top layers 303, a plurality of bottom layers 305, and at least one heat-release-valve 301. In some embodiments, foam core 101 may be with at least one stringer (e.g., 103, 105, or both 103 and 105). In some embodiments, foam core 101 may be disposed between the plurality of top layers 303 and the plurality of bottom layers 305. In some embodiments, the plurality of top layers 303 may be comprised of one or more of: top-structural-layer 201, fiberglass-layer 107, resin-finish-layer 109, and top-deck-layer 111. In some embodiments, the plurality of bottom layers 305 may be comprised of one or more of: bottom-structural-layer 203, fiberglass-layer 113, resin-finish-layer 115, and bottom 117.

In some embodiments, the at least one heat-release-valve 301 may have an internal portion that may be facing foam core 101 when installed in surfboard 300. In some embodiments, the at least one heat-release-valve 301 may comprise an external portion that may be facing away from foam core 101 when installed in surfboard 300. In some embodiments, the internal portion and the external portion of a given heat-release-valve 301 may be disposed opposite of each other. In some embodiments, the at least one heat-release-valve 301 may be configured to release heat, pressure, gas, liquid, combinations thereof, and/or the like from foam core 101 when a temperature of foam core 101 exceeds (or reaches) a predetermined temperature.

New types of surfboards, methods and/or systems for making such surfboard have been described. The foregoing description of the various embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical embodiments, it is to be understood that the invention is not to be limited to the disclosed embodiments, but on the contrary, is intended to cover various modifications and equivalent arrangements included within the spirit and scope of the appended claims.

What is claimed is:

1. A surfboard for minimizing overheating of the surfboard, wherein the surfboard comprises:
    a foam core with at least one stringer;
    a plurality of top layers;
    a plurality of bottom layers, wherein the foam core is disposed between the plurality of top layers and the plurality of bottom layers; and
    at least one heat-release-valve comprising a housing and a biasing member; wherein the housing comprises an internal portion and an external portion; wherein the internal portion is facing the foam core, wherein the external portion is facing away from the foam core, wherein the internal portion and the external portion are disposed opposite of each other, wherein disposed at least partially within the housing is the biasing member, wherein the at least one heat-release-valve is configured to automatically release heat and pressure from the foam core when a temperature of the foam core exceeds a predetermined temperature by the biasing member translating from a default closed position into an open position, wherein the default closed position exists when the temperature of the foam core is below the predetermined temperature.

2. The surfboard according to claim 1, wherein the housing is a substantially cylindrical member with at least one internal through cavity, wherein the at least one internal through cavity links the internal portion to the external portion.

3. The surfboard according to claim 1, wherein at least a portion of the housing is inserted and anchored into the plurality of top layers.

4. The surfboard according to claim 1, wherein at least a portion of the housing is inserted and anchored into the plurality of bottom layers.

5. The surfboard according to claim 1, wherein the surfboard comprises a pair of rails running down longitudinal sides of the surfboard, wherein at least a portion of the housing is inserted and anchored into at least one of the pair of rails.

6. The surfboard according to claim 1, wherein the surfboard comprises at least one fin box attached to the plurality of bottom layers, wherein the at least one heat-release-valve is attached to the at least one fin box.

7. The surfboard according to claim 1, wherein when the temperature of the foam core is below the predetermined temperature, the at least one heat-release-valve is closed, in the default closed position, minimizing entry of water, that is external to the surfboard, from getting to the foam core.

8. The surfboard according to claim 1, wherein the at least one stringer comprises at least one central-stringer that runs substantially down a middle of the surfboard and in a direction that is substantially parallel with a length of the surfboard;
   wherein the plurality of top layers comprises:
      at least one structural-layer that is attached to both an exterior region of the foam core and to a top exterior of the at least one central-stringer; wherein the at least one structural-layer is comprised of at least one sheet of plastic, metal, or wood;
      at least one fiberglass-layer attached to an exterior region of the at least one structural-layer; and
      at least one resin-finish-layer attached to an exterior region of the at least one fiberglass-layer;
   wherein the attachment of the at least one structural-layer to the exterior region of the foam core and to the top exterior of the at least one central-stringer provides structural strength to the surfboard.

9. The surfboard according to claim 1, wherein the at least one stringer comprises at least one central-stringer that runs substantially down a middle of the surfboard and in a direction that is substantially parallel with a length of the surfboard;
   wherein the plurality of bottom layers comprises:
      at least one structural-layer that is attached to both an exterior region of the foam core and to a bottom exterior of the at least one central-stringer; wherein the at least one structural-layer is comprised of at least one sheet of plastic, metal, or wood;
      at least one fiberglass-layer attached to an exterior region of the at least one structural-layer; and
      at least one resin-finish-layer attached to an exterior region of the at least one fiberglass-layer;
   wherein the attachment of the at least one structural-layer to the exterior region of the foam core and to the bottom exterior of the at least one central-stringer provides structural strength to the surfboard.

10. The surfboard according to claim 1, wherein the at least one stringer comprises at least one central-stringer that runs substantially down a middle of the surfboard and in a direction that is substantially parallel with a length of the surfboard;
    wherein the plurality of top layers comprises:
       at least one top structural-layer that is attached to both a top exterior region of the foam core and to a top exterior of the at least one central-stringer;
       at least one top fiberglass-layer attached to a top exterior region of the at least one top structural-layer; and
       at least one top resin-finish-layer attached to a top exterior region of the at least one top fiberglass-layer;
    wherein the plurality of bottom layers comprises:
       at least one bottom structural-layer that is attached to both a bottom exterior region of the foam core and to a bottom exterior of the at least one central-stringer;
       at least one bottom fiberglass-layer attached to a bottom exterior region of the at least one bottom structural-layer; and
       at least one bottom resin-finish-layer attached to a bottom exterior region of the at least one fiberglass-layer;
    wherein the at least one top structural-layer and the at least one bottom structural-layer are each comprised of at least one sheet of plastic, metal, or wood;
    wherein in a transverse width cross-section of the surfboard, the at least one top structural-layer, the at least one central-stringer, and the at least one bottom structural-layer form a structure that substantially resembles a capital letter "I" with upper bilateral serifs, lower bilateral serifs and a vertical stem linking the upper bilateral serifs to the lower bilateral serifs; with the at least one central-stringer substantially resembling the vertical stem portion of the capital letter "I," the at least one top structural-layer substantially resembling the upper bilateral serifs of the capital letter "I," and the at least one bottom structural-layer substantially resembling the lower bilateral serifs of the capital letter "I";
    wherein the attachment of the at least one top structural-layer to the top exterior region of the foam core and to the top exterior of the at least one central-stringer provides structural strength to the surfboard; and
    wherein the attachment of the at least one bottom structural-layer to the bottom exterior region of the foam core and to the bottom exterior of the at least one central-stringer provides structural strength to the surfboard.

* * * * *